June 18, 1935.  G. W. WILSON  2,005,486
ELECTRIC GENERATOR SYSTEM
Filed Aug. 5, 1932
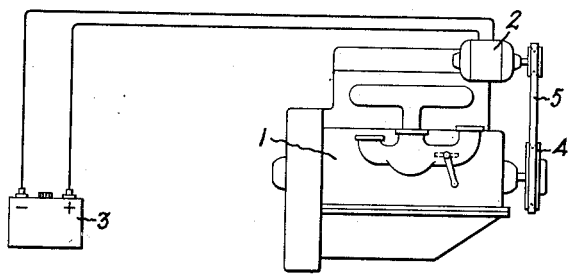
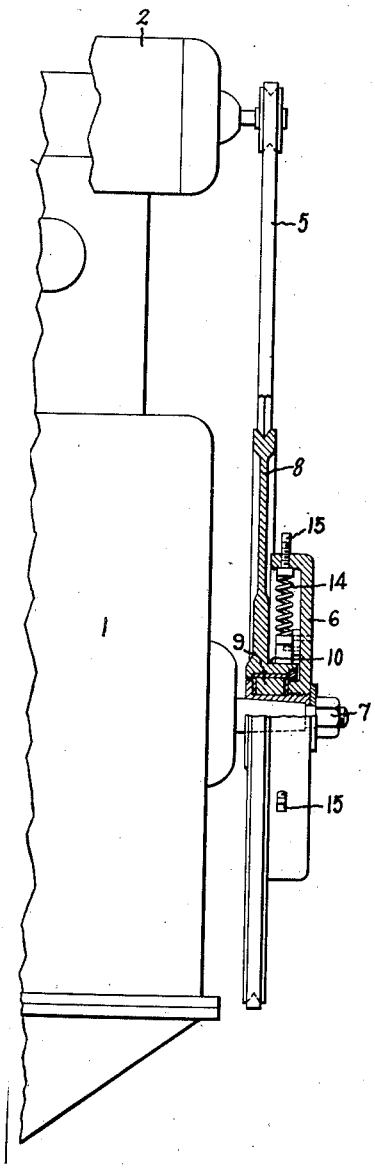
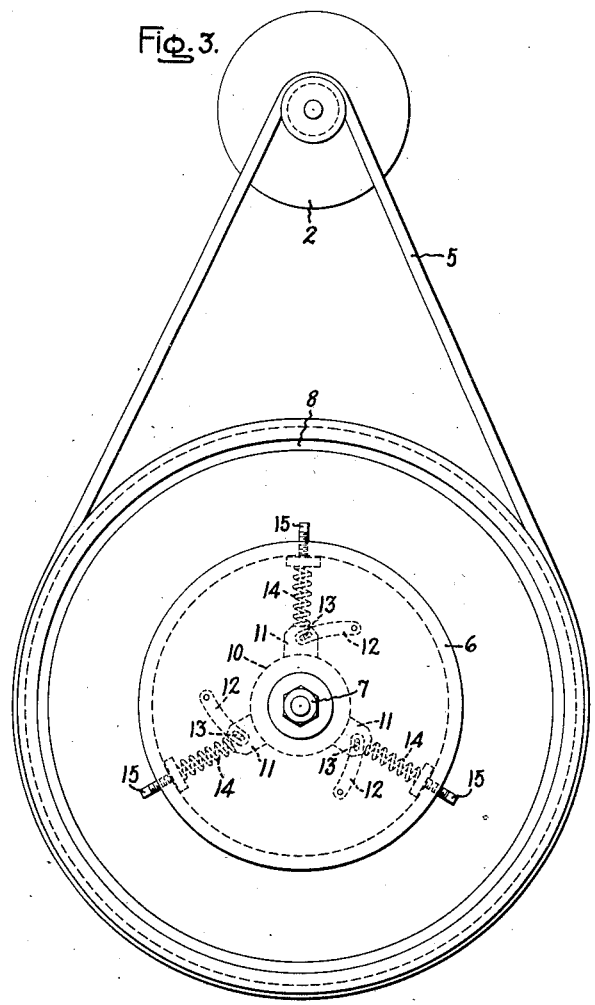
Inventor:
Guy W. Wilson,
by Charles E. Tullar
His Attorney.

Patented June 18, 1935

2,005,486

UNITED STATES PATENT OFFICE 2,005,486

ELECTRIC GENERATOR SYSTEM

Guy W. Wilson, Erie, Pa., assignor to General Electric Company, a corporation of New York Application August 5, 1932, Serial No. 627,592

2 Claims. (Cl. 290—50)

My invention relates to electric generator systems, and more particularly to an electric generator system for charging the storage battery of door-to-door delivery type automobile trucks.

In the past, difficulty has been experienced in maintaining the storage battery of direct engine driven door-to-door delivery type automobile trucks properly charged. This is because such trucks are often idling for as much as 60% of the total time in which they are in use, and during idling the voltage of the charging generator is usually not sufficiently high to charge the battery.

In accordance with my invention, I provide an arrangement which insures proper battery charging during the time that the truck engine is idling. In the manner in which I at present intend to practice my invention, I provide an overspeed release clutch for driving the battery charging generator from the truck engine. The clutch is so arranged that at normal idling speed the clutch will be thrown in and the charging generator will be operated, but as soon as the engine is accelerated in a manner to cause operation of the truck the clutch will throw out or be released. I may either use a special generator which will provide sufficient charging at relatively low speeds corresponding to the idling speeds of the engine, or by a suitable drive I may overdrive the ordinary charging generator so that although the engine is operating at idling speed, the generator will operate at sufficiently high speed to cause the proper charging of the battery at substantially the rated output of said generator.

An object of my invention is to provide a new and improved electrical generator system.

Another object of my invention is to provide an improved battery charging system for automobile type delivery trucks.

My invention will be better understood from the following description taken in connection with the accompanying drawing and its scope will be pointed out in the appended claims.

In the drawing, in which like reference characters designate similar parts throughout the several figures, Fig. 1 is a schematic view of my invention illustrating the electrical connections, while Figs. 2 and 3 illustrate the details thereof on a larger scale.

Referring now to the drawing, 1 is a gasoline engine such as is commonly employed for operating delivery trucks; having a battery charging generator 2 for charging a battery 3, such as is commonly employed on automobile trucks.

For insuring proper operation of generator 2 during the idling speeds of engine 1, I provide a suitable overspeed release clutch 4, which connects the crankshaft of engine 1 to generator 2 through a suitable driving connection, such as a V belt 5. A satisfactory form of the clutch 4 is shown in detail in Figs. 2 and 3 and consists of a driving member 6, which is fastened to the shaft of engine 1 in any suitable manner such as by means of a nut 7, and a driven member, or pulley, 8 which is relatively movable with respect to the driving member 6, and is mounted thereon by means of a bearing 9. Driven member 8 has a clutch face 10 and driving member 6, and is provided with three clutch shoes 11, which are restrained in their proper paths of movement by means of pivoted links 12 which are connected to the shoes by means of slot and pin connections 13. Suitable springs 14 serve to urge the clutch shoes 11 against the clutch face 10, whereby the friction produced causes the driven member to rotate with the driving member. Suitable adjusting means, such as screws 15 are provided for adjusting the compression of the springs 14.

In operation, if the speed of engine 1 is below a predetermined value, the friction between the clutch surface 10 and the clutch shoes 11 will be sufficient to cause the driving member 6 and the driven member 8 to operate in an integral manner and thereby cause the operation of generator 2, which in turn produces energy of sufficient voltage to charge the storage battery 3 at a normal, or predetermined rate. If the speed of engine 1 exceeds the predetermined speed, which will be the normal idling speed of the engine, the centrifugal force on the clutch shoes 11 will throw them outwardly thereby to release the clutch and allow the generator 2 to come to rest.

It should of course be understood that the usual automatic cutout will be provided between the generator 2 and the battery 3 so that the battery cannot discharge into the generator 2 when the latter's voltage is below the voltage of the battery. Such devices are provided on practically all automobiles so that a detailed description thereof is believed to be unnecessary.

While I have shown and described a particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. The combination, with a direct engine driven automobile having a battery charging system consisting of a storage battery and a battery charging generator, of means for adapting said system to frequent stop operation of the automobile wherein the engine thereof idles a maximum percentage of the time of said operation comprising an over-driving connection between the engine and the generator which operates the generator at sufficient speed for battery charging purposes when the engine is idling, and means for preventing the generator from charging the battery when the engine is operating substantially above its idling speed.

2. The combination, with a direct engine driven automobile having a battery charging system consisting of a storage battery and a battery charging generator, of means for adapting said system to frequent stop operation of the automobile wherein the engine thereof idles a maximum percentage of the time of said operation comprising an over-driving connection between the engine and the generator which operates the generator at sufficient speed for battery charging purposes when the engine is idling, and an overspeed release clutch in said over-driving connection for breaking said connection and permitting said generator to come to rest when the engine is operating substantially above its idling speed.

GUY W. WILSON.